United States Patent [19]
Williams et al.

[11] Patent Number: 5,820,981
[45] Date of Patent: Oct. 13, 1998

[54] RADIATION VISBROKEN POLYPROPYLENE AND FIBERS MADE THEREFROM

[75] Inventors: Stephen D. Williams, Newark; Hee Ju Yoo, Wilmington, both of Del.; Miriam R. Drickman, Boulder, Colo.

[73] Assignee: Montell North America Inc., Wilmington, Del.

[21] Appl. No.: 626,412

[22] Filed: Apr. 2, 1996

[51] Int. Cl.⁶ .......................... D02G 3/00; C08F 110/06; C08F 210/02; C08F 210/06
[52] U.S. Cl. .......................... 428/364; 442/327; 442/400; 442/414; 522/112; 522/157; 522/161; 526/351; 526/348
[58] Field of Search ..................... 522/157, 161, 522/112; 526/351, 348; 528/483; 428/364; 442/327, 400, 414

[56] References Cited

U.S. PATENT DOCUMENTS

| | | | |
|---|---|---|---|
| 3,231,481 | 1/1966 | Amemiya et al. | 204/154 |
| 3,711,389 | 1/1973 | Hook et al. | 204/159.12 |
| 3,783,115 | 1/1974 | Zeppenfield | 204/159.2 |
| 4,146,417 | 3/1979 | Drelich et al. | 156/62.2 |
| 4,151,023 | 4/1979 | Platt et al. | 156/62.2 |
| 4,282,076 | 8/1981 | Boynton | 204/159.2 |
| 4,668,577 | 5/1987 | Ohta et al. | 428/364 |
| 4,748,044 | 5/1988 | Fottinger et al. | 427/44 |
| 4,911,867 | 3/1990 | Burlet et al. | 264/22 |
| 4,916,198 | 4/1990 | Scheve et al. | 526/351 |
| 5,017,423 | 5/1991 | Bossmann et al. | 428/224 |
| 5,047,446 | 9/1991 | DeNicola | 522/157 |
| 5,078,925 | 1/1992 | Rolando et al. | 264/6 |
| 5,160,464 | 11/1992 | Ward et al. | 264/22 |
| 5,200,439 | 4/1993 | Asanuma | 522/157 |
| 5,206,092 | 4/1993 | Araki et al. | 428/447 |
| 5,248,729 | 9/1993 | Inoue et al. | 525/92 |
| 5,414,027 | 5/1995 | DeNicola et al. | 522/112 |

*Primary Examiner*—Susan W. Berman

[57] ABSTRACT

A propylene homopolymer having a stick-point of 30 cm or less during melt spinning, an oligomer content of less than 1500 ppm without postpolymerization treatment to remove oligomers, and a melt flow rate greater than 300 dg/min is prepared by radiation visbreaking in a multistage fluidized bed reactor. The polymer is subjected to irradiation in the substantial absence of oxygen, followed by a multistage treatment in the presence of a controlled amount of oxygen. The radiation visbreaking process can also be applied to other propylene polymer materials. The propylene polymer materials produced by this radiation visbreaking process can be used, for example, for extrusion coating, film production, and injection molding.

11 Claims, 1 Drawing Sheet

RADIATION VISBROKEN POLYPROPYLENE AND FIBERS MADE THEREFROM

FIELD OF THE INVENTION

This invention relates to radiation visbroken propylene polymer materials, and to fibers, films, and other articles made therefrom.

BACKGROUND OF THE INVENTION

Propylene polymers can be subjected to chain scission to produce lower molecular weight products, a process that is commonly called visbreaking. This process not only lowers the molecular weight and raises the melt flow rate of the polymers, but it also leads to a narrowing of the molecular weight distribution. Generally speaking, higher molecular weight leads to better physical properties but poorer processing properties. Conversely, lower molecular weight leads to poorer physical properties, but better processing properties. A low molecular weight polymer with narrow molecular weight distribution gives both good physical and processing properties in many fabricated articles. Therefore, it has been common procedure in the past to polymerize propylene to a higher molecular weight than desired for the final application, and then to visbreak to the desired molecular weight.

Several different types of chemical reactions that are well known can be employed for visbreaking propylene polymers. An example is thermal pyrolysis, which is accomplished by exposing a polymer to high temperatures, e.g., in an extruder at 350° C. or higher. Another approach is exposure to powerful oxidizing agents. A further approach is exposure to ionizing radiation. For example, U.S. Pat. No. 4,282,076 discloses a process for reducing the molecular weight of a propylene polymer by activating a first portion of the polymer by exposure to ionizing radiation, adding the irradiated polymer to a second portion of unirradiated polymer, adding a stabilizing amount of an antioxidant to the mixture, and visbreaking by shear mixing in an extruder.

Another method, which is the method used almost exclusively in commercial practice, is the addition of a prodegradant to the polymer before pelletization. A prodegradant is a substance that promotes chain scission when mixed with the polymer, which is then heated under extrusion conditions. The prodegradants used in current commercial practice are mainly alkyl hydroperoxides or dialkyl peroxides. These materials initiate a free radical chain reaction at elevated temperatures, resulting in scission of the polypropylene molecules. The use of alkyl hydroperoxide or dialkyl peroxide prodegradants has been a satisfactory method of visbreaking polymers in many respects, but there is considerable room for improvement. One objectionable feature is the presence of decomposition products of the prodegradants that remain in the polymer as contaminants. These decomposition products can be noxious during subsequent treatment of the polymer and during use of products made from the polymer.

Irradiation of polymers can also be used to produce desirable properties other than reduction in molecular weight and narrowing of the molecular weight distribution. For example, U.S. Pat. No. 4,916,198 discloses a process for making gel-free polypropylene having strain hardening elongational viscosity from polypropylene that does not have strain hardening elongational viscosity. The polymer is irradiated in the essential absence of oxygen until substantial chain scission of the linear propylene polymer material has occurred without causing gelation of the polymer, and maintaining the irradiated polymer in such an environment for a period of time sufficient for significant formation of long chain branches. The irradiated polymer is then treated in the essential absence of oxygen to deactivate the free radicals. U.S. Pat. No. 5,047,446 describes a process for treating a free radical-containing, irradiated high molecular weight propylene polymer material to further enhance long chain branching and radiation-induced free radical formation, and to render the polymer stable on long-term storage in the presence of air. A two-stage fluid bed process is used in which the first stage employs an intermediate temperature for radical recombination and the second stage employs a higher temperature for radical deactivation.

When alpha-olefins are polymerized, the product is a blend of molecular strands or chains of alpha-olefin units, which have many different chain lengths. While the lengths of most of the chains represent thousands of carbon atoms, inevitably there are chains of much shorter length, which can be as low as two alpha-olefin units. The shorter chain length molecules are referred to as oligomers. In this specification, "oligomer" is defined as a chain of alpha-olefin units whose number of carbon atoms is less than 40. The oligomers can be separated from the polymer particles in an unreacted monomer removal procedure generally performed after the polymerization step or steps. Oligomers can also be formed in a polymer as the result of postpolymerization treatments such as, for example, visbreaking and melt extrusion.

In most commercial alpha-olefin polymers, the concentration of oligomers in the polymer particles is not high enough to cause a problem. Indeed, the presence of oligomers can have a beneficial effect on the melt rheology of the polymers. However, especially in the case of substantially crystalline propylene polymers with high melt flow rates (>10 dg/min, ASTM D 1238, Condition L (230° C., 2.16 kg)) in which the oligomer concentration is frequently in the range of 1000–10,000 parts per million parts by weight of the polymer, a substantial concentration of oligomers in the polymer causes the emission of "smoke" from the polymer when it is melt extruded, for example, when it is being converted into fibers. However, not all of the oligomers are emitted from the molten polymer after it leaves the die and before it is cooled to the temperature at which it solidifies. The residual oligomer in the extruded polymer can result in objectionable taste and odor in articles such as fibers, packaging film, and containers made from the extruded polymer.

One area of particular interest is the production of polypropylene meltblown fibers, and nonwoven materials made from these fibers. Commercial resins intended for this use are currently made in two steps. First, high melt flow rate (MFR) polypropylene granules, e.g., 400 MFR, are produced in a reactor. Because the molecular weight distribution (MWD) is too broad for adequate spinnability, peroxide is added to the granule to break the molecular chain, thus narrowing the MWD while increasing MFR. For example, 500 ppm of peroxide can be added to a 400 MFR polymer granule to lower the MWD from 4.0 to 3.2. In this step, the MFR increases to 800. This technology has a number of limitations. First, and most important, the oligomer content of the polymer is high enough to produce defects in the product. The oligomers, being light in weight, tend to become gaseous products during spinning at high temperatures, giving off smoke and condensate during spinning operations, which can cause health problems as well as defects in the product. In some polymerization processes, a washing column is installed to wash the oligomers from the polymer granules. In addition, the amount of peroxide to be added must be limited because the polymer granule has limited absorptivity for liquid peroxide, and because too much peroxide leaves a residue that can cause skin irritation. Therefore polymers produced by this process have limitations in the maximum achievable MFR as well as in the range of MWD.

There is still a need for a process in which the MFR and MWD of the propylene polymer material can be controlled over a wide range while producing a product with a low oligomer content, i.e., less than 1500 ppm, without any postpolymerization treatment to remove oligomers.

SUMMARY OF THE INVENTION

The propylene homopolymers of this invention have a stick-point of 30 cm or less during melt spinning, an oligomer content of less than 1500 ppm without postpolymerization treatment to remove oligomers, and a melt flow rate greater than 300 dg/min.

The method of this invention for treating an irradiated propylene polymer material comprises (1) exposing a free radical-containing, irradiated propylene polymer material selected from the group consisting of (a) propylene homopolymers having an isotactic index of at least 90, (b) random copolymers of propylene and ethylene or butylene, or random terpolymers of propylene, ethylene, and butylene, wherein the maximum ethylene content, or ethylene plus butylene content, is 10% by weight, having an isotactic index of at least 80, and (c) heterophasic propylene polymer materials consisting essentially of, by weight, (i) 99–55% of a polymeric material selected from the group consisting of a propylene homopolymer having an isotactic index greater than 90, and a crystalline copolymer of propylene and an alpha-olefin of the formula $CH_2=CHR$, where R is H or a 2–6 carbon linear or branched alkyl group, having an isotactic index of at least 80, the alpha-olefin being less than 10% of the copolymer, and (ii) 1–45% of an elastomeric olefin polymer of propylene and an olefinic material selected from the group consisting of alpha-olefins of the formula $CH_2=CHR$, where R is H or a 2–6 carbon linear or branched alkyl group, the alpha-olefin being 50–70% of the elastomeric polymer, to a controlled amount of active oxygen of greater than 0.004% and less than 15% by volume at a temperature $T_1$ of 40°–110° C., (2) heating to a temperature $T_2$ of at least 110° C. in the presence of a controlled amount of oxygen within the same range as in step (1), and (3) maintaining the polymer at temperature $T_2$ in the presence of 0.004% or less by volume of active oxygen.

Using the process of this invention for radiation visbreaking of propylene polymer materials, the melt flow rate and molecular weight distribution of the polymers can be varied within wide limits to accommodate specific requirements in making meltblown and spunbonded nonwoven materials, in the case of the propylene homopolymer, and other fabricated articles. The propylene polymer materials made by this method have a much lower oligomer content than the current commercial propylene polymer grades, without the need for postpolymerization treatment to remove oligomers, and are essentially odor-free, thereby avoiding the need to deodorize. It is also possible to obtain polymers with a higher MFR than can be made by extrusion and pellitization of peroxide-visbroken polymers, where the practical limit is a MFR of 100–200 dg/min using typical commercial equipment. In addition, the properties of the polymer product, e.g., the melt flow rate and viscosity, are more uniform than is the case with current commercial peroxide-visbroken polypropylene.

The propylene polymer materials made by the radiation visbreaking process of this invention can be used, for example, for film and fiber production, extrusion coating, and injection molding.

DETAILED DESCRIPTION OF THE INVENTION

Figure 1:
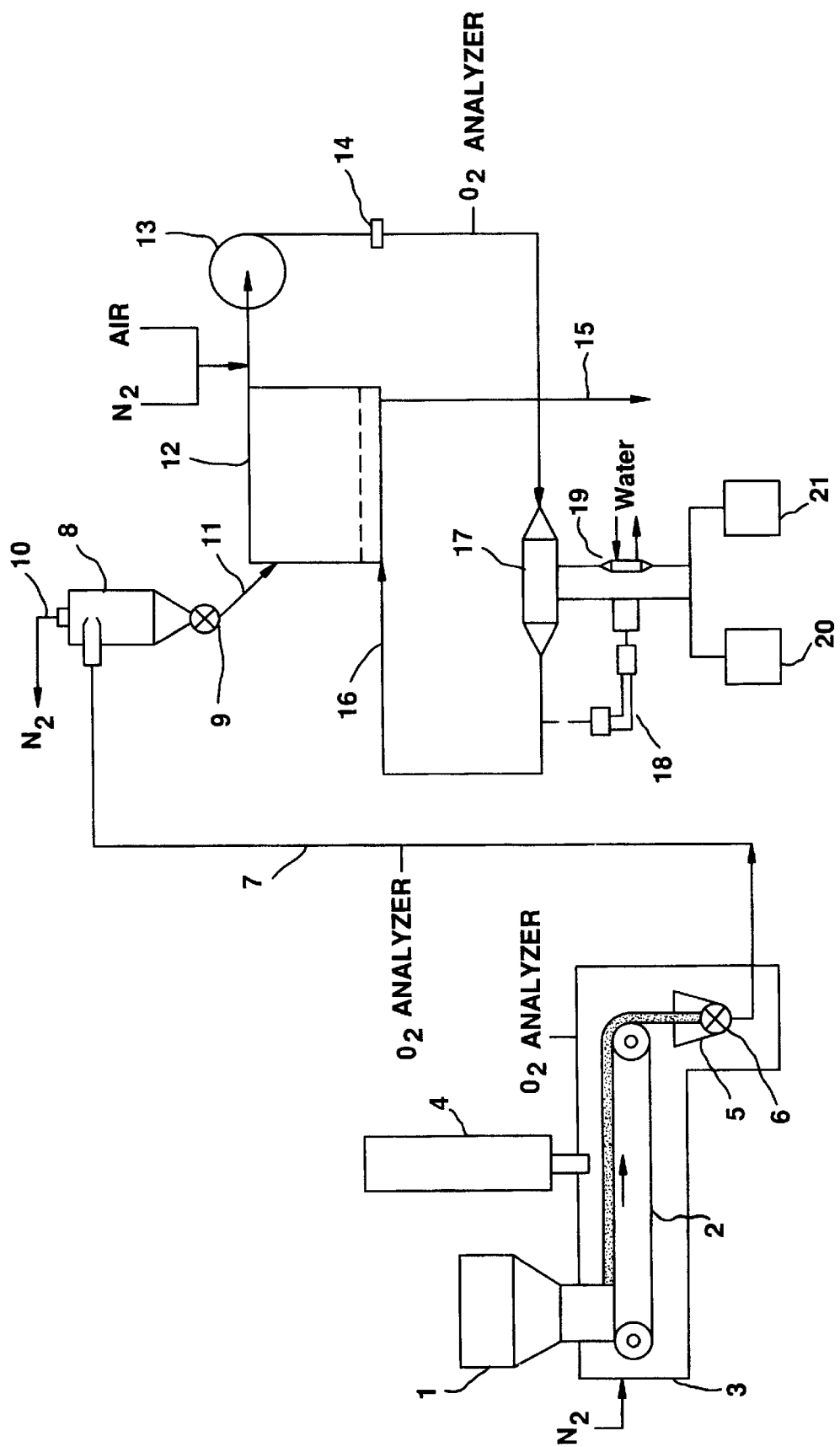
FIG. 1 is a schematic flow sheet of a fluid bed system for making the visbroken propylene polymer materials of this invention.

The propylene polymer material used as the starting material in the process of this invention is selected from the group consisting of (a) propylene homopolymers having an isotactic index of at least 90, preferably 95–98, (b) random copolymers of propylene and ethylene or butylene, or random terpolymers of propylene, ethylene, and butylene, wherein the maximum ethylene content, or ethylene plus butylene content, is 10%, preferably 1%–5% by weight, having an isotactic index of at least 80, preferably 85 or more, and (c) heterophasic propylene polymer materials consisting essentially of, by weight, (i) 99–55% of a polymeric material selected from the group consisting of a propylene homopolymer having an isotactic index greater than 90, and a crystalline copolymer of propylene and an alpha-olefin of the formula $CH_2=CHR$, where R is H or a 2–6 carbon linear or branched alkyl group, having an isotactic index of at least 80, the alpha-olefin being less than 10% of the copolymer, and (ii) 1–45%, preferably 8–25%, and most preferably 10–20%, of an elastomeric polymer of propylene and an olefinic material selected from the group consisting of alpha-olefins of the formula $CH_2=CHR$, where R is H or a 2–6 carbon linear or branched alkyl group, the alpha-olefin being 50–70%, preferably 40–70%, and most preferably 55–70%, of the elastomeric copolymer.

When a propylene homopolymer is used as the starting material, any propylene homopolymer having an isotactic index of at least 90% can be used. If the polymer is to be used for making fibers, it should preferably be in the form of flake or high porosity spheres, i.e., physical forms with a high surface/volume ratio. Pellets and spheres with normal density are not suitable for fiber applications when the polymer is treated by the process of this invention. For applications other than fibers, e.g., molding, films, and extrusion coating, the propylene polymer material can be in any physical form, for example, finely divided particles, granules, or pellets.

The propylene polymer material is exposed to high energy ionizing radiation in an essentially oxygen-free environment in which the active oxygen concentration is established and maintained at less than 15%, preferably less than 5%, and most preferably 0.004% or lower by volume.

The ionizing radiation should have sufficient energy to penetrate to the extent desired the mass of propylene polymer material being irradiated. The ionizing radiation can be of any kind, but the most practical kinds are electrons and gamma rays. Preferred are electrons beamed from an electron generator having an accelerating potential of 500–4,000 kilovolts. Satisfactory results are obtained at a dose of ionizing radiation of about 0.1 to about 15 megarads, preferably about 0.5 to about 4.0 megarads.

The term "rad" is usually defined as that quantity of ionizing radiation that results in the absorption of 100 ergs of energy per gram of irradiated material using the process described in U.S. Pat. No. 4,916,198 mentioned previously. Energy absorption from ionizing radiation is measured by the well known conventional dosimeter, a measuring device in which a strip of polymer film containing a radiation-sensitive dye is the energy absorption sensing means. Therefore, as used in this specification, the term "rad" means that quantity of ionizing radiation resulting in the absorption of the equivalent of 100 ergs of energy per gram of the polymer film of a dosimeter placed at the surface of the propylene polymer material being irradiated, whether in the form of a bed or layer of particles, or a film, or a sheet.

The free radical-containing irradiated propylene polymer material is then subjected to a series of oxidative treatment steps. The preferred way of carrying out the treatment is to pass the irradiated polymer through a fluid bed assembly operating at $T_1$ in the presence of a controlled amount of oxygen, passing the polymer through a second fluid bed assembly operating at $T_2$ in the presence of an amount of oxygen within the same range as in the first step, and then maintaining the polymer at $T_2$ in the substantial absence of oxygen, i.e. an oxygen concentration equal to or less than 0.004% by volume, in a third fluid bed assembly. In commercial operation a continuous process using three separate fluid beds is preferred. However, the process can also be carried out in a batch mode in one fluid bed, using a fluidizing gas stream heated to the desired temperature for each treatment step. Unlike some techniques, such as melt extrusion methods, the fluidized bed method does not require the conversion of the irradiated polymer into the molten state and subsequent resolidification and comminution into the desired form.

The first treatment step consists of heating the irradiated polymer in the presence of a controlled amount of active oxygen of greater than 0.004% but less than 15% by volume, preferably less than 8%, and most preferably less than 3%, to a temperature of 40° to 110° C., preferably about 80° C. Heating to the desired temperature is accomplished as quickly as possible, preferably in less than 10 minutes. The polymer is then held at the selected temperature, typically for about 90 minutes, to increase the reaction rate of the oxygen with the free radicals in the polymer. The holding time, which can be easily determined by one skilled in the art, depends upon the properties of the starting material, the active oxygen concentration used, the irradiation dose, and the temperature. The maximum time is determined by the physical constraints of the fluid bed.

In the second treatment step, the irradiated polymer is heated in the presence of a controlled amount of oxygen in the same range as used in the first treatment step to a temperature of at least 110° C. up to the softening point of the polymer (140° C. for the homopolymer). The polymer is then held at the selected temperature, typically for about 90 minutes, to increase the rate of chain scission and minimize recombination to form long chain branches. The holding time is determined by the same factors discussed in relation to the first treatment step.

In the third treatment step, the polymer is held at the temperature selected for the second treatment step for about 10 to about 120 minutes, preferably about 60 minutes, in the substantial absence of active oxygen, i.e., 0.004% by volume or less, preferably less, to produce a product that is stable during subsequent storage under ambient conditions. After the third treatment step, the polymer is cooled to a temperature of about 70° C. over a period of about 10 minutes in an essentially oxygen-free atmosphere before being discharged from the bed.

The expression "active oxygen" means oxygen in a form that will react with the irradiated propylene polymer material. It includes molecular oxygen, which is the form of oxygen normally found in air. The active oxygen content requirement of the process of this invention can be achieved by use of a vacuum or by replacing part or all of the air in the environment by an inert gas such as, for example, nitrogen.

Control of the oxygen level in the fluid bed gas stream is accomplished by the addition of air at the suction side of the blower. Air or oxygen must be constantly added to compensate for the oxygen consumed by the formation of peroxides in the polymer. The fluidizing medium can be, for example, nitrogen or any other gas that is inert with respect to the free radicals present, e.g., argon, krypton, and helium.

In the flow sheet shown in FIG. 1, the conveyor belt feed hopper 1 is a capped structure of conventional design. It is operated so that its interior contains an atmosphere essentially free of active oxygen, e.g., a nitrogen atmosphere. It has a bottom solids discharge outlet through which the polymer particles move and form a layer on the top horizontal run of an endless conveyor belt 2.

The horizontal conveyor belt 2 is contained in radiation chamber 3 and moves continuously under normal operating conditions. The radiation chamber completely encloses the conveyor belt, and is constructed and operated to establish and maintain an atmosphere essentially free of active oxygen in its interior.

In combination with radiation chamber 3 is an electron beam generator 4 of conventional design and operation. Under normal operating conditions it generates a beam of high energy electrons directed to the layer of polymer particles on the conveyor belt 2. Below the discharge end of the conveyor belt is a solids collector 5 arranged to receive the irradiated propylene polymer material falling off of the conveyor belt 2 as it turns into its path of opposite travel. Irradiated particles in the solids collector 5 are removed by a rotary valve or star wheel 6 and delivered to a solids transfer line 7.

The transfer line 7 leads to a gas-solids separator 8. This unit is of conventional construction and is usually a cyclone type separator. Gas that is separated is removed, for example, by gas discharge conduit 10, while separated solids are discharged, for example, by a rotary valve or star wheel 9, into a solids discharge line 11. The solids discharge line 11 leads to a fluid bed unit 12.

This fluid bed is of conventional design, is sealed, and is constructed and operated to establish and maintain an atmosphere containing a controlled amount of active oxygen in its interior. A gas stream containing a controlled amount of active oxygen is introduced through conduit 16 into fluid bed 12 via a closed loop assembly containing blower 13, damper 14, and heat exchanger 17. Butterfly damper 14 is used to control and maintain the desired gas velocity through the fluid bed. Circulating gas passes through heat exchanger 17, where it is heated to the desired temperature. An oil circulating system consisting of oil heaters 20 and 21, heat exchanger 19, and temperature control loop 18 is used to maintain the desired temperature in the gas stream. Two separate oil heaters 20 and 21 are used to minimize the time required to change temperatures during polymer processing by having the heaters set at the desired temperatures and directing the appropriate temperature oil to heat exchanger 17. Heat exchanger 19 is an oil-to-water heat exchanger of conventional design, used to provide additional temperature control for the hot oil system. The heated gas passes through conduit 16 into the under side of the fluid bed plenum and through a distributor plate. The velocity of the gas is maintained so as to produce a fluidizing action in the polymer particle bed. The fluid bed is operated in a batch mode. Thus the residence time is controlled by the amount of time that the propylene polymer material is maintained in the fluid bed. The propylene polymer material exits the unit through a manually controlled valve and passes through discharge line 15 into a collection container.

Knowing the MFR of the starting material, the dose during the irradiation step, the oxygen level during the first and second treatment steps, the temperature, and the time can be adjusted to obtain the desired MFR in the visbroken product.

The radiation-visbroken propylene homopolymer of this invention is characterized by having a stick-point of 30 cm or less during melt spinning; an oligomer content of less than 1500 ppm without postpolymerization treatment to remove oligomers, and a melt flow rate greater than 300 dg/min.

The radiation-visbroken propylene homopolymer prepared by the process described above can be used to spin fibers that are converted into meltblown and spunbonded nonwoven materials, and can also be used in any other applications where MFR and MWD have to be tailored to meet specific end use requirements.

Techniques for the formation of nonwoven webs by meltblowing and spunbonding are well known in the art. Meltblown fibers are very fine and typically have a diameter of about 3 μm, which is smaller by an order of magnitude than the smallest traditional spunbonded fiber. A special die uses a heated, pressurized fluid, usually air, to attenuate the molten polymer filament as it leaves the orifice of the die or nozzle. The weak, discontinuous fibers are deposited on a forming screen as a random, entangled web. In the preparation of spunbonded materials, the polymer is continuously extruded through a spinneret to form discrete filaments. Thereafter, the filaments are drawn pneumatically without breaking in order to molecularly orient the polymer filaments and achieve tenacity. The continuous filaments are then deposited in a substantially random manner onto a carrier belt to form a web.

The propylene polymer materials prepared by the process of this invention can be used, for example, for extrusion coating; film production, particularly cast films; melt spinning of fibers, and for injection molding, particularly for the molding of thin walled containers. The propylene polymer materials can also be blended with 5% to 95% of a normally solid, predominantly isotactic, semicrystalline, linear propylene polymer material for use in melt processing and other operations for making useful articles.

The stick-point of a polymer is determined as follows. In polymeric materials, stress-induced crystallization is the dominant mode of solidification during melt spinning, during which a high degree of orientation is achieved. The crystallization rate is a function of the molecular structure of the material being processed. Therefore, the measurement of the point of solidification during spinning can be used to differentiate different polymers. The point of solidification is measured by sliding a metal rod along the moving threadline, starting from 70 cm away from the spinneret face. As the rod is moved upward, it reaches a point where the polymer is still molten. At this point the threadline sticks to the rod and breaks. The "stick-point" is defined as the distance from the spinneret face to the point at which the threadline sticks to the rod and breaks. Low values for the stick-point measurement are desirable. The melt spinning of the fibers for the test is carried out at a throughput rate of 0.5 g/hole/minute, without forced air quenching, a melt temperature of 190° C., and a spinning speed of 1000 m/minute. The hole diameter of the die is 0.5 mm and the length/diameter ratio of the die is 4.

The percent xylene solubles at room temperature is determined by dissolving 2.5 g of the polymer in 250 ml of xylene in a vessel equipped with a stirrer, which is heated to 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until constant weight is reached.

In the examples, the following methods were used to determine the physical properties of the radiation-visbroken polymers and of the fabricated materials or articles prepared from these polymers: melt flow rate (MFR)—ASTM-D 1238, Condition L; trapezoid tear strength—ASTM-D 1117-80, air permeability—ASTM-D 1117-80, and hydrohead—AATCC Test Method 127-1989.

Polydispersity Index (PI) was used as a measure of the molecular weight distribution in the polymer. The modulus separation at a low modulus value, i.e., 500 Pa, was determined at a temperature of 200° C. by using a parallel-plate rheometer model RMS-800, available from Rheometrics (USA), operating at an oscillation frequency that increases from 0.1 rad/sec to 100 rad/sec. From the modulus separation value, the PI value can be derived using the following equation: $PI=54.6(\text{modulus separation})^{-1.76}$, where the modulus separation is defined as:

$$\text{modulus separation} = \frac{\text{frequency at } G' = 500 \text{ Pa}}{\text{frequency at } G'' = 500 \text{ Pa}}$$

where G' is the loss storage modulus and G" is the modulus value obtained from the test.

Unless otherwise noted, all parts and percentages in this specification are by weight.

EXAMPLE 1

This example illustrates how processing conditions can be varied to obtain a polymer product with approximately the same melt flow rate (R).

Propylene homopolymer flake having a nominal M of 20.3, commercially available from Montell USA Inc., is irradiated and exposed to the controlled amount of oxygen shown in Table 1.

The depth of the polymer bed on the conveyor belt is adjusted to equal entrance and exit bed depth by placing dosimeters on the conveyor belt and advancing the conveyor belt under the feed hopper and the bed leveling device. The conveyor belt is stopped and a second dosimeter is placed on the top of the polymer bed. The Van de Graaff accelerator is turned on and adjusted to the desired operating conditions of 2.0 MeV acceleration voltage and 75 microamps beam current. The conveyor belt is operated at 15 inches per minute to transport the polymer bed and dosimeters through the electron beam. After irradiation, the dosimeters on the top and the bottom of the polymer bed are retrieved and measured to determine both the correct bed depth and total dose delivered. Polymer used during this testing is removed from the system.

The conveyor belt feed hopper and conveyor belt cabinet are closed to form a gas-tight enclosure, and the nitrogen purge is turned on to create an oxygen-free atmosphere. At the same time the pneumatic conveying system and fluid bed system are purged with nitrogen. The hot oil systems are set to the proper operating conditions while the nitrogen purge is in progress. The first oil heater is set to control the gas stream temperature at 80° C. and the second oil heater at 140° C.

When the oxygen concentration in the fluid bed system has been reduced to less than 7%, the fluid bed blower is started. When the oxygen concentration has been reduced to the desired point by the nitrogen purge, air is mixed with the nitrogen gas stream to maintain the proper oxygen concentration. Both the nitrogen and air flow rates are set by manual flow meters.

After 45 minutes, the oxygen concentration in the conveyor belt feed hopper, polymer conveyor belt enclosure, and pneumatic conveying system is less than 40 ppm oxygen as measured by trace oxygen analyzers connected to the conveyor belt enclosure and the pneumatic conveying system. During this time period the hot oil systems and the fluid bed system have reached equilibrium temperature and oxygen concentration.

The sample is irradiated using the Van de Graaff accelerator. The conveyor belt is operated at 15 inches per minute for 15 minutes and the irradiated polymer is continuously delivered to the fluid bed by the pneumatic conveying system. At the end of the 15 minute period the conveyor belt and Van de Graaff accelerator are turned off The gas flow in the fluid bed is manually adjusted using a valve in the gas stream while observing the percolating action of the polymer. The polymer is treated in a first stage with the fluidizing gas stream at a temperature of 80° C. for 90 minutes at the oxygen concentration indicated in Table 1 (24,500 ppm=2.4% by volume).

At the end of the first treatment step, the first hot oil heater is isolated from the fluid bed gas stream heat exhanger and the oil heater is turned off At the same time, the second oil heater is placed in service, and the temperature of the fluidizing gas stream is raised to 140° C. There is a transition of appoximately 30 minutes before the polymer temperature in the fluid bed reaches the gas stream temperature. During this second treatment stage, the oxygen concentration is maintained at the previous level for a period of 60 minutes after the transition time.

Following the second treatment step, air addition is terminated and the nitrogen flow rate is increased to the maximum value. After a transition of five minutes, the fluidizing gas stream oxygen concentration is reduced to less than 40 ppm while maintaining a temperature of 140° C. for 60 minutes.

At the end of the third treatment step, the first oil heater, which has been cooling down, is placed back in service and water flow to the water-to-oil heat exchanger is increased to the maximum. During the cooling cycle, the temperature of the polymer in the fluid bed is reduced to less than 80° C. The cooling cycle lasts 45 minutes, after which the polymer is discharged from the fluid bed and collected in a stainless steel vessel.

After the polymer has cooled to room temperature, the melt flow of the polymer is measured under the conditions specified for ASTM 1238-D, Condition L.

The data in Table 1 show that when the radiation dose is varied, the oxygen concentration to which the irradiated polymer is exposed must also be varied in order to obtain the same MFR in the polymer product.

TABLE 1

| | Beam | | | | | First Step | | Second Step | | Third Step Time | Temp. |
|---|---|---|---|---|---|---|---|---|---|---|---|
| Dose (Mrad) | Oxygen (ppm) | Current (µamps) | MFR (dg/min) | PI | Mw (× 10³) | Time (Min) | Temp. (°C.) | Time (Min) | Temp. (°C.) | (Min) | (°C.) (No Oxygen) |
| 0.5 | 24500 | 75 | 510 | 3.60 | 26.2 | 90 | 80 | 60 | 140 | 60 | 140 |
| 1 | 21000 | 75 | 490 | 3.49 | 27.1 | 90 | 80 | 60 | 140 | 60 | 140 |
| 2 | 16000 | 75 | 400 | 3.44 | 29.9 | 90 | 80 | 60 | 140 | 60 | 140 |
| 4 | 12500 | 250 | 500 | 3.90 | 27.7 | 90 | 80 | 60 | 140 | 60 | 140 |

EXAMPLE 2

This example illustrates the effect on visbroken polymer properties when the oxygen concentration to which the irradiated polymer is exposed is held constant, and the radiation dose is varied. The propylene homopolymer used as the starting material is the same as the one described in Example 1. The process conditions and polymer properties are given in Table 2.

The melt flow rate increases as the radiation dose increases.

TABLE 2

| | Beam | | | | | First Step | | Second Step | | Third Step Time | Temp. |
|---|---|---|---|---|---|---|---|---|---|---|---|
| Dose (Mrad) | Oxygen (ppm) | Current (µamps) | MFR (dg/min) | PI | Mw (× 10³) | Time (Min) | Temp. (°C.) | Time (Min) | Temp. (°C.) | (Min) | (°C.) (No Oxygen) |
| 0.5 | 23000 | 75 | 430 | N/A | N/A | 90 | 80 | 60 | 140 | 60 | 140 |
| 1 | 23000 | 75 | 680 | N/A | N/A | 90 | 80 | 60 | 140 | 60 | 140 |

TABLE 2-continued

| | Beam | | | | | First Step | | Second Step | | Third Step Time Temp. | |
|---|---|---|---|---|---|---|---|---|---|---|---|
| Dose (Mrad) | Oxygen (ppm) | Current (μamps) | MFR (dg/min) | PI | Mw (× 10³) | Time (Min) | Temp. (°C.) | Time (Min) | Temp. (°C.) | (Min) | (°C.) (No Oxygen) |
| 2 | 23000 | 75 | 1100 | N/A | N/A | 90 | 80 | 60 | 140 | 60 | 140 |
| 4 | 23000 | 250 | 1400 | N/A | N/A | 90 | 80 | 60 | 140 | 60 | 140 |

EXAMPLE 3

This example illustrates the effect on visbroken polymer properties when the radiation dose during irradiation and the oxygen concentration to which the irradiated polymer is exposed are held constant, as well as the duration of the treatment in each of the three treatment stages, and the temperature in the first treatment stage is varied. The propylene homopolymer starting material is the same as the one described in Example 1. The process conditions and polymer properties are given in Table 3.

The MFR of the visbroken polymer decreases as the temperature in the first treatment stage increases.

COMPARATIVE EXAMPLE 5

This example shows the effect on MFR over time when the third treatment stage, i.e., maintaining at an oxygen concentration equal to or less than 0.004% by volume at $T_2$, is omitted after the irradiation of a propylene homopolymer.

Polymers A and B, both propylene homopolymers, are irradiated and exposed to oxygen as described in Example 1. Polymer A, commercially available from Montell USA Inc., is a highly porous propylene homopolymer having xylene solubles (wt. %) at ambient temperature of 3.5, a MFR of 9.0, a pore volume fraction of 0.28 wherein more than 90% of the pores have a diameter larger than 1 micron, and a

TABLE 3

| | Beam | | | | | First Step | | Second Step | | Third Step Time Temp. | |
|---|---|---|---|---|---|---|---|---|---|---|---|
| Example | Dose (Mrad) | Oxygen (ppm) | Current (μamp) | MFR (dg/min) | PI | Mw (× 10³) | Time (Min) | Temp. (°C.) | Time (Min) | Temp. (°C.) | (Min) (°C.) (No Oxygen) |
| 3 | 1 | 23000 | 75 | 770 | N/A | N/A | 90 | 60 | 60 | 140 | 60 140 |
| 3 | 1 | 23000 | 75 | 430 | N/A | N/A | 90 | 100 | 60 | 140 | 60 140 |
| 3 | 1 | 23000 | 75 | 300 | N/A | N/A | 90 | 120 | 60 | 140 | 60 140 |
| 4 | 2 | 20000 | 75 | 525 | | | 90 | 80 | 60 | 140 | 60 140 |

EXAMPLE 4

The propylene homopolymer described in Example 1 is irradiated at a dose of 2 Mrad and exposed to 20,000 ppm oxygen under the conditions indicated in Table 3. The oligomer content of the starting polymer is 1900 ppm and the oligomer content of the visbroken polymer is 727 ppm.

porosity of 0.45 cc/g. Polymer B is a propylene homopolymer flake having a MFR of 23.8 and is commercially available from Montell USA Inc.

The MFR of the polymers is measured at regular intervals to determine whether MFR remains stable over time. As can be seen in Table 4, MFR increases steadily with time when stage three of the process of this invention is omitted.

TABLE 4

| Polymer Type | | Beam | | | | First Step | | Second Step | | | |
|---|---|---|---|---|---|---|---|---|---|---|---|
| | | Dose (Mrad) | Oxygen (ppm) | Current (μamps) | MFR (dg/min) | Time (Min) | Temp. (°C.) | Time (Min) | Temp. (°C.) | | |
| A | | 0.5 | 10000 | 75 | 830 | 90 | 80 | 60 | 140 | | |
| B | | 0.5 | 23000 | 75 | 820 | 90 | 80 | 60 | 140 | | |
| | Time since irradiation (weeks) | 1 | 3 | 4 | 7 | 11 | 12 | 14 | 15 | 17 | |
| A | MFR(dg/min) | 1100 | 1400 | 1700 | 2360 | 2500 | | | | | |
| B | MFR(dg/min) | 810 | 830 | 920 | 1000 | 1270 | 1260 | 1700 | 2100 | 2700 | |

EXAMPLE 6

This example shows the effect on polymer properties when a propylene/ethylene random copolymer is irradiated according to the process described in Example 1. The processing conditions are shown in Table 5. Polymer C is a random copolymer of propylene and ethylene containing 3.2% ethylene and having a nominal melt flow rate of 1.9 dg/min. Polymer D is a random copolymer of propylene and ethylene containing 3.2% ethylene and having a nominal MFR of 13.3. Polymer E is a propylene/ethylene random copolymer containing 3.2% ethylene having a nominal MFR of 5.5. All of the random copolymers are commercially available from Montell USA Inc. The polymer properties are shown in Table 5.

Polymer E has an oligomer content before irradiation of 469 ppm and an oligomer content of 214 ppm after irradiation.

EXAMPLE 8

A radiation-visbroken polymer is made by the process described in Example 1 by subjecting the same propylene homopolymer flake to a dose of 0.5 Mrad and exposing the irradiated polymer to 24,000 ppm oxygen in the first and second treatment steps. Before the radiation treatment the propylene homopolymer has a nominal MFR of 20 dg/min and an oligomer content of 1200 ppm. The irradiated polymer is analyzed for MFR, polydispersity index (PI), and oligomer content. The "peroxide-visbroken polymer" in the table is made from a propylene homopolymer having a nominal MFR of 400 dg/min containing 500 ppm Lupersol 101 peroxide, available from Atochem; 1000 ppm Irganox 1076 antioxidant, available from Ciba Geigy, and 300 ppm calcium stearate. The polymer is commercially available from Montell USA Inc. Reaction with the peroxide takes place during heating for the MFR determination. The results of the analyses are given in Table 7.

TABLE 5

| Polymer Type | Dose (Mrad) | Beam Oxygen (ppm) | Beam Current (μamp) | MFR (dg/min) | PI | Mw (× 10³) | First Step Time (Min) | First Step Temp. (°C.) | Second Step Time (Min) | Second Step Temp. (°C.) | Third Step Time (Min) (No Oxygen) | Third Step Temp. (°C.) (No Oxygen) |
|---|---|---|---|---|---|---|---|---|---|---|---|---|
| C | 0.5 | 15000 | 75 | 31 | 2.43 |     | 90 | 80 | 60 | 120 | 60 | 120 |
| C | 1.0 | 12000 | 75 | 36 | 2.54 |     | 90 | 80 | 60 | 120 | 60 | 120 |
| C | 2.0 | 8000  | 75 | 30 | 2.62 |     | 90 | 80 | 60 | 120 | 60 | 120 |
| D | 0.5 | 7000  | 75 | 34 | 2.95 | 214 | 90 | 80 | 60 | 120 | 60 | 120 |
| E | 0.5 | 10000 | 75 | 37 | 2.73 | 207 | 90 | 80 | 60 | 120 | 60 | 120 |

EXAMPLE 7

This example shows the effect on polymer properties when a heterophasic propylene polymer material is irradiated according to the process described in Example 1. The heterophasic composition has a MFR of 3.6 and a total ethylene content of 8.9% and contains 85% propylene homopolymer and 15% of an ethylene/propylene rubber containing 60% ethylene units. The heterophasic material is commercially available from Montell USA Inc. The processing conditions and the polymer properties are shown in Table 6.

TABLE 7

| Polymer Type | MFR (dg/min) | PI | Oligomer Content (ppm) |
|---|---|---|---|
| Peroxide-visbroken polymer | 800 | 3.2 | 8000 |
| Radiation-visbroken polymer | 500 | 2.5 | 950 |

TABLE 6

| Dose (Mrad) | Beam Oxygen (ppm) | Beam Current (μamp) | MFR (dg/min) | PI | First Step Time (Min) | First Step Temp. (°C.) | Second Step Time (Min) | Second Step Temp. (°C.) | Third Step Time (Min) (No Oxygen) | Third Step Temp. (°C.) (No Oxygen) |
|---|---|---|---|---|---|---|---|---|---|---|
| 0.5 | 3000   | 75  | 5.2  | 2.46 | 90 | 80 | 60 | 120 | 60 | 120 |
| 0.5 | 10000  | 75  | 7.6  | 2.64 | 90 | 80 | 60 | 120 | 60 | 120 |
| 1   | 3000   | 75  | 5.4  | 2.55 | 90 | 80 | 60 | 120 | 60 | 120 |
| 1   | 10,000 | 75  | 12.3 | 2.63 | 90 | 80 | 60 | 120 | 60 90 | 120 |
| 1   | 30000  | 75  | 28.9 | 2.48 | 90 | 80 | 60 | 120 | 60 | 120 |
| 2   | 3000   | 250 | 8.6  | 2.65 | 90 | 80 | 60 | 120 | 60 | 120 |
| 2   | 10000  | 250 | 14.2 | 2.71 | 90 | 80 | 60 | 120 | 60 | 120 |
| 2   | 30000  | 250 | 26.4 | 2.51 | 90 | 80 | 60 | 120 | 60 | 120 |

The radiation visbroken polymer made by the process of this invention has a narrower MWD and a much lower oligomer content than peroxide visbroken propylene homopolymer.

EXAMPLE 9

The polymers described in Example 8 are made into meltblown fabrics using a small pilot meltblown line. The spinning conditions used are:

| | |
|---|---|
| Through-put rate | 0.4 g/hole/min |
| Melt temperature | 450° F. |
| Air temperature | 450° and 500° F. |
| Basis weight | 34 g/m² |

The fabrics made are tested for trapezoid tear strength, bending length, hydrohead, and air permeability. In the table, gsm=grams/m². The results are given in Table 8.

TABLE 8

| | Air Tempera- ture (°F.) | Trapezoid Tear Strength | | Bending Length (cm/g) | Hydrohead (cm water) | Air Permeabil- ity (%) |
|---|---|---|---|---|---|---|
| | | MD (g/gsm) | CD (g/gsm) | | | |
| Peroxide- visbroken polymer | 450 | 15.5 | 16.9 | 32 | 40 | 24 |
| | 500 | 9.1 | 14.3 | 25 | 48 | 37 |
| Radiation- visbroken polymer | 450 | 18.7 | 21.3 | 26 | 40 | 34 |
| | 500 | 17.2 | 22.8 | 36 | 44 | 41 |

The radiation-visbroken polymer prepared according to the process of this invention produces meltblown fabrics with better trapezoid tear strength, whereas bending length (a measure of fabric softness), air permeability, and hydrohead are similar to those of fabrics made from peroxide-visbroken propylene homopolymer fibers.

EXAMPLE 10

A small laboratory fiber line, designated as PMSD (precision melt spin draw), is used to determine the point of solidification of the polymer samples during melt spinning, the "stick-point" of the polymer. The spinning conditions used are:

| | |
|---|---|
| Through-put rate | 0.5 g/hole/min |
| Melt temperature | 190° C. |
| Spinning speed | 1000 m/min |
| Quench | quiescent air |

The polymer from which the peroxide-visbroken fibers are spun is the same as the one used for making the peroxide-visbroken polymer in Example 8. Reaction with the peroxide takes place when the polymer is heated for spinning. The radiation-visbroken polymers are prepared as described in Example 1. The radiation dose and the concentration of oxygen to which the irradiated polymer is exposed after irradiation are indicated in Table 9, as well as the results of the stick-point measurements.

TABLE 9

| Polymer Type | Stick-Point (cm) |
|---|---|
| Peroxide-visbroken | 45 |
| Radiation-visbroken at 0.5 Mrad; 28,500 ppm $O_2$ | 30 |
| Radiation-visbroken at 1 Mrad; 21,000 ppm $O_2$ | 25 |
| Radiation-visbroken at 2 Mrad; 15,500 ppm $O_2$ | 21 |

All three samples of radiation-visbroken polymers have a shorter stick-point than the peroxide-visbroken polymer. Stick-point decreases steadily as the dose level increases. This indicates that the crystallization rate increases with irradiation and that the effect is greater at higher doses.

EXAMPLE 11

In this example, plaques and test bars are molded from a radiation visbroken polymer and a peroxide visbroken polymer and the physical properties and oligomer content are measured and compared.

The starting polymer in both cases is commercially available from Montell USA Inc. and is a random copolymer of propylene and ethylene containing 3.2% ethylene units having a MFR of 2 dg/min. The polymer is irradiated as described in Example 1 using a radiation dose of 0.5 Mrads and the irradiated polymer is exposed to 15,000 ppm (1.5% by volume) oxygen under the conditions shown in Table 5.

The polymers are mixed with 0.12 parts B-215 phenolic/phosphite antioxidant available from Ciba Geigy, 0.05 parts calcium stearate, and 0.20 parts Millad 3988 clarifying agent available from Milliken. The polymer to be peroxide-visbroken also contains enough Lupersol 101 peroxide, available from Elf Atochem, to produce a melt flow of 35 dg/min, and 0.06 parts Atmer 122 antistatic agent, available from ICI. All parts are by weight per hundred parts of polymer. The polymer compositions are extruded in a cconventional single screw extruder and pelletized. The pelletized composition is then molded into plaques and test bars on a 200 ton HPM molding machine at a melt temperature of 360° F. and a mold temperature of 140° F. Physical properties are measured by the following methods: flexural modulus—ASTM-D 790; notched Izod impact—ASTM-D 256; haze—ASTM-D 1003-92. Oligomers are determined as volatiles by gas chromatography.

Color is measured according to ASTM-D 1925-70, Section I, using a Hunter D25P-2 calorimeter in the total transmission mode, which is first standardized using air as a reference. Yellowness is defined as the deviation from whiteness in the dominant wavelength range from 570 to 580 nm. The yellowness index (YI) is a measure of the magnitude of yellowness relative to a magnesium oxide standard reference. The lower the number the better the color.

The results of the measurements are given in Table 10.

TABLE 10

| | Radiation Visbroken Polymer | Peroxide Visbroken Polymer |
|---|---|---|
| MFR (dg/min) | 40 | 35 |
| PI | 2.47 | 2.22 |
| Mw(× 10³) | 197 | 217 |
| Flexural modulus (kpsi) | 144.5 | 142.0 |
| Notched Izod impact (ft. lb/in) | 1.96 | 1.5 |

TABLE 10-continued

|  | Radiation Visbroken Polymer | Peroxide Visbroken Polymer |
|---|---|---|
| Haze @ 40 mil | 9.2 | 9 |
| YI @ 40 mil | 3.9 | 3.7 |
| Volatiles (ppm) | 38.2 | 527 |

The data show that the radiation visbroken polymer has mechanical properties that are comparable to or better than the peroxide visbroken product and that the radiation visbroken product has a much lower volatiles content than the peroxide visbroken polymer. Because of the low volatiles, the irradiated resin has low taste and odor properties.

EXAMPLE 12

This example illustrates the use of the radiation visbroken polymers of this invention in extrusion coating.

A propylene homopolymer having a nominal MFR of 2 dg/min and commercially available from Montell USA Inc. is irradiated according to the process described in Example 1. The radiation dose is 1.0 Mrad and the irradiated polymer is exposed to 12,000 ppm (1.2% by volume) of oxygen in the first and second steps. The polymer is maintained at a temperature of 80° C. for 90 minutes in the first step and at 140° C. for 60 minutes in the second step. In the third step, the polymer is held at 140° C. for 60 minutes in the presence of less than 40 ppm (0.004% by volume) of oxygen. The visbroken product has a MFR of approximately 35 dg/min.

A phenolic antioxidant (0.1 parts) and calcium stearate (0.07 parts) are added to 100 parts of the irradiated polymer and the mixture is extruded in a conventional single screw extruder at 230° C. and pelletized. All parts are by weight. The pelletized composition is then extruded through a 6.35 cm Davis-Standard extruder with a barrel length-to-diameter ratio of 26:1 and a screw of the metering type with 5 compression flights and 13 metering flights, into a center fed, key hole type 40.6 cm wide Egan die. The composition is extruded onto a moving substrate just prior to the substrate entering the nip between a chill roll and a nip roll. The following conditions apply to the formation of the extrusion coated product:

| Barrel temperatures | 204° C., 260° C., 288° C. and 304° C. |
|---|---|
| Adapter temperature | 321° C. |
| Die temperature | 321° C. |
| Air gap | 8.9 cm |
| Chill roll temperature | 16° C. |
| Nip pressure | 13 kg/cm$^2$ |
| Substrate | 13.6 kg/ream (500 sheets, 61 cm x 91.4 cm) unbleached kraft paper |
| Linear speed range of takeup system | 30 m/min–305 m/min |
| Extrusion rate | 36.3 kg/hr |

EXAMPLE 13

This example illustrates the use of the radiation visbroken polymers of this invention in making blown film.

A random copolymer of propylene and ethylene containing 3.2% ethylene having a nominal MFR of 1.9 dg/min and commercially available from Montell USA Inc. is irradiated according to the process described in Example 1. The radiation dose is 0.5 Mrad and the irradiated polymer is exposed to 3,000 ppm (0.3% by volume) of oxygen in the first and second steps. The polymer is maintained at a temperature of 80° C. for 90 minutes in the first step and at a temperature of 120° C. for 60 minutes in the second step. In the third step, the polymer is maintained at a temperature of 120° C. for 60 minutes in the presence of less than 40 ppm of oxygen. The visbroken product has a MFR of 9 dg/min.

A phenolic antioxidant (0.1 parts) and calcium stearate (0.07 parts) are added to 100 parts of the irradiated polymer in a conventional single screw extruder at 230° C. and the mixture is pelletized. All parts are by weight. The pelletized composition is then extruded in a modified Chi Chang water-quenched blown film line comprising a 50 mm extruder with a barrel length-to-diameter ratio of 26:1, and a 100 mm diameter annular die without the usual water ring, but with a larger capacity blower connected to the air ring. The air ring is a single lip air ring with a 45° lip angle and is located 4.25 cm below the die. The gap of the air ring is adjustable, but is set at 9 mm. The tower height is 1.9 meters. The polished nip rolls are driven by a variable speed motor that allows the linear take-off speed of the film to be adjusted. The following conditions apply to the formation of the blown film product:

| Processing temperature | 200° C. |
|---|---|
| Extrusion rate | 14.4 kg/hr |
| Drawdown ratio, MD/CD | 6.7/2.7 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A method for treating an irradiated propylene polymer material comprising (1) adding a controlled amount of oxygen to a free radical-containing, irradiated propylene polymer material selected from the group consisting of
   (a) propylene homopolymers having an isotactic index of at least 90,
   (b) random copolymers of propylene and ethylene or butylene, or random terpolymers of propylene, ethylene, and butylene, wherein the maximum ethylene content, or ethylene plus butylene content, is 10% by weight, having an isotactic index of at least 80, and
   (c) heterophasic propylene polymer materials consisting essentially of, by weight,
      (i) 99–55% of a polymeric material selected from the group consisting of a propylene homopolymer having an isotactic index greater than 90, and a crystalline copolymer of propylene and an alpha-olefin of the formula $CH_2=CHR$, where R is H or a 2–6 carbon linear or branched alkyl group, having an isotactic index of at least 80, the alpha-olefin being less than 10% of the copolymer, and
      (ii) 1–45% of an elastomeric olefin polymer of propylene and an olefinic material selected from the group consisting of alpha-olefins of the formula $CH_2=CHR$, where R is H or a 2–6 carbon linear or branched alkyl group, the alpha-olefin being 50–70% of the elastomeric polymer, so that the irradiated propylene polymer material is exposed to an amount of active oxygen of greater than 0.004% and less than 15% by volume at a temperature $T_1$ of 40°–110° C., (2) heating the polymer to a temperature $T_2$ of at least 110° C. in the presence of a controlled amount of oxygen within the same range as in step (1), and (3) maintaining the polymer at $T_2$ in the presence of 0.004% or less by volume of active oxygen.

2. A propylene polymer material made by the process of claim 1.

3. A film-forming composition consisting essentially of the propylene polymer material of claim 2.

4. An extrusion coating composition consisting essentially of the propylene polymer material of claim 2.

5. A fiber-forming composition consisting essentially of the propylene polymer material of claim 2.

6. An injection molding composition consisting essentially of the propylene polymer material of claim 2.

7. A film comprising the propylene polymer material of claim 2.

8. A fiber comprising the propylene polymer material of claim 2.

9. A nonwoven material comprising the fiber of claim 8.

10. An injection molded article comprising the propylene polymer material of claim 2.

11. A blend of the propylene polymer material of claim 2 and 5%–95% by weight of a normally solid, predominantly isotactic, semicrystaliline, linear propylene polymer material.

* * * * *

UNITED STATES PATENT AND TRADEMARK OFFICE
CERTIFICATE OF CORRECTION

PATENT NO.  : 5,820,981
DATED       : October 13, 1998
INVENTOR(S) : Stephen D. Williams et al It is certified that error appears in the above-indentified patent and that said Letters Patent is hereby corrected as shown below:

At col. 8, line 37, after "G' is the" delete --loss-- and after
    "G" is the" insert --loss--.

At col. 8, line 46, change "(R)" to --MFR--.

At col. 8, line 47, change "M" to --MFR--.

Signed and Sealed this

Twenty-third Day of February, 1999

Attest:

Q. TODD DICKINSON

Attesting Officer     Acting Commissioner of Patents and Trademarks